United States Patent
Christison et al.

(10) Patent No.: US 9,523,535 B1
(45) Date of Patent: Dec. 20, 2016

(54) METHOD FOR MAKING A SOIL REMEDIATION PRODUCT

(71) Applicants: Jack Devin Christison, Stafford, TX (US); Frank Joseph Marx, Stafford, TX (US); Stephanie Marie Marx, Stafford, TX (US)

(72) Inventors: Jack Devin Christison, Stafford, TX (US); Frank Joseph Marx, Stafford, TX (US); Stephanie Marie Marx, Stafford, TX (US)

(*) Notice: Subject to any disclaimer, the term of this patent is extended or adjusted under 35 U.S.C. 154(b) by 384 days.

(21) Appl. No.: 14/062,790

(22) Filed: Oct. 24, 2013

Related U.S. Application Data

(60) Provisional application No. 61/718,606, filed on Oct. 25, 2012.

(51) Int. Cl.
 C09K 17/32 (2006.01)
 F26B 3/00 (2006.01)
 C05F 5/00 (2006.01)

(52) U.S. Cl.
 CPC ............... *F26B 3/00* (2013.01); *C05F 5/002* (2013.01); *C09K 17/32* (2013.01)

(58) Field of Classification Search
 CPC .......... C05F 5/002; C09K 17/32; F23B 3/00
 See application file for complete search history.

(56) References Cited

U.S. PATENT DOCUMENTS

| | | | |
|---|---|---|---|
| 4,407,789 A | 10/1983 | Eigen et al. | |
| 4,571,389 A | 2/1986 | Goodwin et al. | |
| 5,503,931 A | 4/1996 | Goodman, Sr. | |
| 5,597,399 A * | 1/1997 | Basu | C05D 3/00 71/9 |
| 6,878,179 B2 | 4/2005 | Porubcan | |
| 7,044,994 B2 | 5/2006 | Porubcan | |
| 7,442,224 B2 | 10/2008 | Porubcan | |
| 2006/0065028 A1* | 3/2006 | Nudelman | C05D 9/00 71/23 |
| 2009/0113791 A1* | 5/2009 | Bertin | A01G 9/1086 47/9 |
| 2010/0234223 A1* | 9/2010 | Pursell | A01N 25/12 504/101 |
| 2011/0000268 A1* | 1/2011 | Schaafsma | A23K 1/004 71/6 |
| 2013/0108373 A1* | 5/2013 | Laukkanen | C08L 1/02 405/128.7 |
| 2013/0145687 A1* | 6/2013 | Cristobal | C09K 17/52 47/58.1 SC |

FOREIGN PATENT DOCUMENTS

JP 2503343 B2 * 6/1996 ............ C05F 1/002

* cited by examiner

*Primary Examiner* — Benjamin Fiorello
(74) *Attorney, Agent, or Firm* — Buskop Law Group, PC; Wendy Buskop

(57) ABSTRACT

A method for making a soil remediation product using dehydrated and decontaminated manure and a method for providing a time release of nutrients and water to turf and plants in the soil. Further, a method form making a soil remediation product using vulcanized rice hulls.

10 Claims, 3 Drawing Sheets

---

FORMING AGGLOMERATED GRANULES MADE OF DEHYDRATED DECONTAMINATED MANURE SLURRY, VULCANIZED RICE HULLS, AND WATER — *100*

DRYING THE AGGLOMERATED GRANULES USING A TEMPERATURE UP TO 1000 DEGREES FAHRENHEIT, RAISING THE TEMPERATURE OF THE AGGLOMERATED GRANULES OVER A PRESET PERIOD OF TIME TO REDUCE WATER CONTENT IN THE AGGLOMERATED PARTICLES BY AT LEAST 20 WEIGHT PERCENT, AND FORMING DRIED AGGLOMERATED PARTICLES WITH .25 WEIGHT PERCENT TO 99.75 WEIGHT PERCENT VULCANIZED RICE HULLS — *102*

COOLING THE DRIED AGGLOMERATED PARTICLES — *104*

BLENDING FROM 30 WEIGHT PERCENT TO 50 WEIGHT PERCENT OF THE COOLED DRIED AGGLOMERATED PARTICLES WITH A 50 WEIGHT PERCENT TO 70 WEIGHT PERCENT OF A CONVENTIONAL FERTILIZER, FORMING A USABLE SOIL REMEDIATION PRODUCT THAT HOLDS AT LEAST 10 WEIGHT PERCENT MORE WATER THAN CONVENTIONAL FERTILIZER WITHOUT THE DRIED AGGLOMERATED PARTICLES. THE BLEND PROVIDES A TIMED RELEASE OF NUTRIENTS TO THE PLANTS IN THE SOIL INTO WHICH THE SOIL REMEDIATION PRODUCT HAS BEEN APPLIED IN PART DUE TO THE PRESENCE OF NANOPARTICLES IN THE PRODUCT — *106*

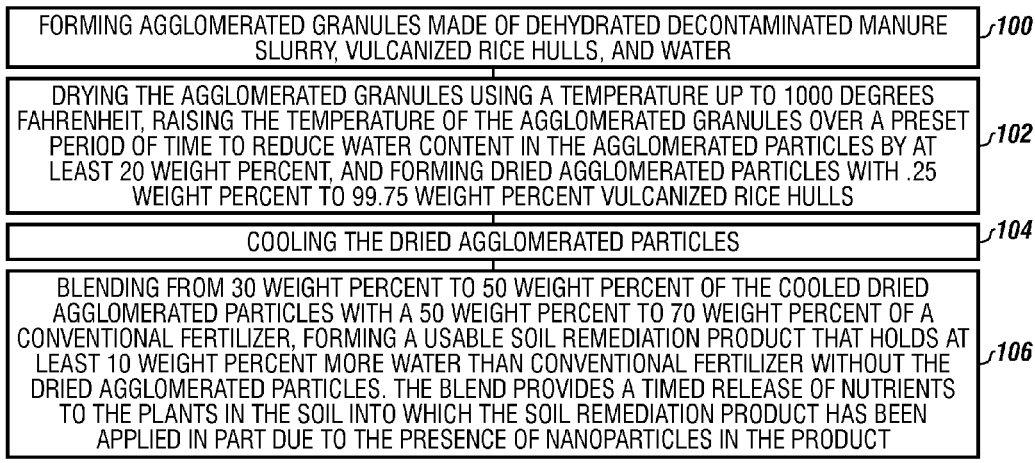
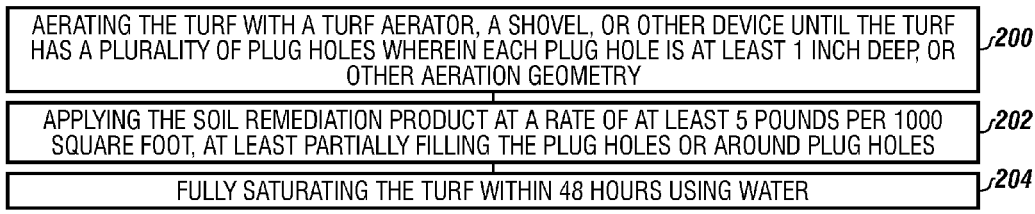
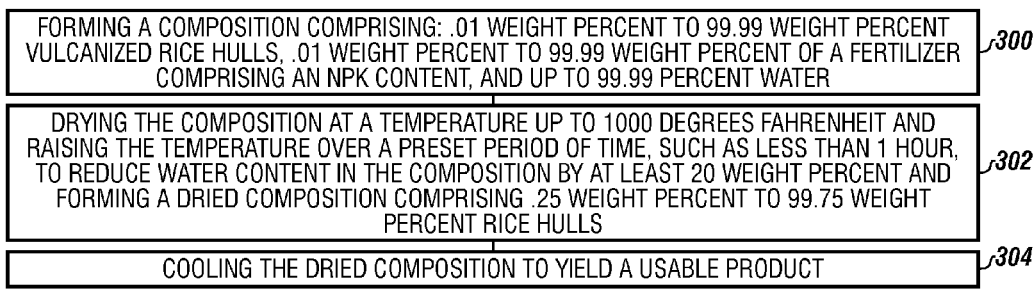

METHOD FOR MAKING A SOIL REMEDIATION PRODUCT

CROSS REFERENCE TO RELATED APPLICATION

The current application claims priority to and the benefit of U.S. Provisional Patent Application Ser. No. 61/718,606 filed on Oct. 25, 2012, entitled "METHOD FOR MAKING A SOIL REMEDIATION PRODUCT." This reference is hereby incorporated in its entirety.

FIELD

The present embodiments generally relate to methods for making a soil remediation product for agricultural use, a product made by the method, and methods for using the soil remediation product.

BACKGROUND

A need exists for a soil remediation product that allows continuous release of nutrients to the soil.

A further need exists for a soil remediation product that can absorb water, which can then be later deployed to the soil.

The present embodiments meet these needs.

BRIEF DESCRIPTION OF THE DRAWINGS

The detailed description will be better understood in conjunction with the accompanying drawings as follows:

FIG. 1 is a diagram of the steps for producing the soil remediation product according to one or more embodiments.

FIG. 2 is a diagram of the steps of the method for using the soil remediation product of FIG. 1 according to one or more embodiments.

FIG. 3 shows the steps for an alternate embodiment for making the soil remediation product.

Figure 4:
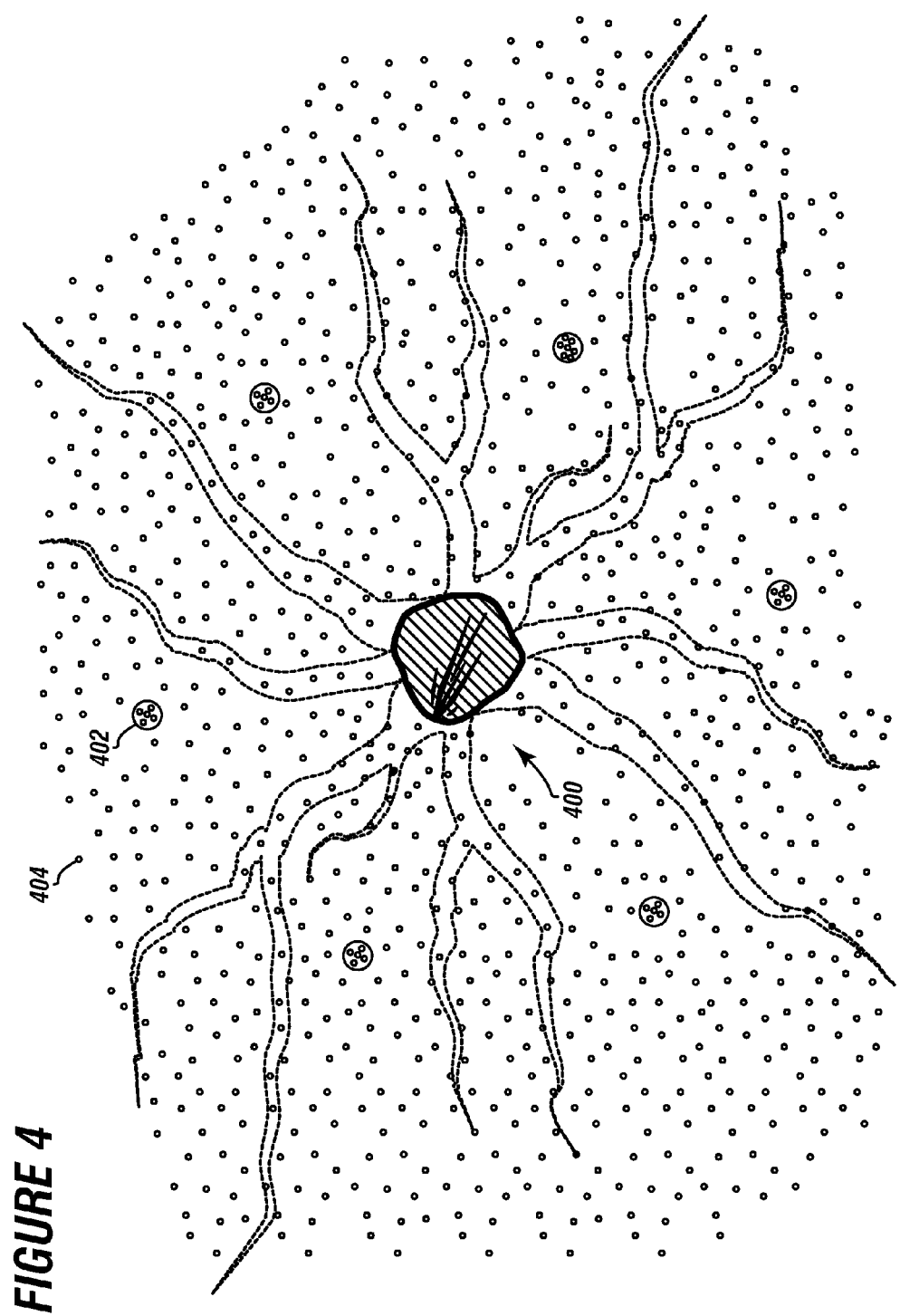
FIG. 4 shows an example of a top view of a root structure according to one or more embodiments.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments relate to a method for making a soil remediation product, and the product produced by that method. The embodiments also relate to a method for using the soil remediation product.

The invention is usable to help people by enabling them to inexpensively add a material that is non-toxic to their soil, which can hold water and provide a timed release of nutrients to their crops.

The invention will help production of local crops using soil amended with the soil remediation product. The soil remediation product will reduce water usage significantly and reduce related costs while increasing harvest yield and quality.

Although designed primarily for crops, the product can also be used for plants, trees, shrubs, turfs, grass, and the like.

The invention is expected to reduce water usage by 10 percent along with related costs, providing savings that compound annually over time.

The product has the ability to suspend water against gravity, while simultaneously making the water available to plants, trees, and turf as needed.

The product has thermal energy reduction properties and can additionally be used for insulating root zones from extreme heat and freezing events. In roof gardens it has proven to permanently reduce energy costs for the building or structure. The product further aids and speeds seed germination.

The invention is a soil remediation product that uses unique agglomeration granules made from vulcanized rice hulls and dehydrated and partially decontaminated manure mixed with conventional fertilizer to extend the conventional fertilizer and hold water in areas in which it is applied.

The phrase "soil remediation product" as used herein can refer to a product made with vulcanized rice hulls and dehydrated partially decontaminated manure. Other materials which may be utilized in lieu of dehydrated partially decontaminated manure can be humates, houactinite, alfalfa, animal manure, kelp, cotton seed meal, fish, bat guano, bone meal, organic compost, green manure crops, micro nutrients, conventional fertilizer, components of conventional fertilizer and combinations thereof.

The phrase "dehydrated and partially decontaminated manure" as used herein can refer to a member of the group: animal manure, animal parts (including feathers, eggs, and combinations thereof), human manure, recyclable vegetation, including agricultural byproducts, and humates, wherein humates are defined to be substances formed by the biological and chemical breakdown of animal and plant life over a period of time to cause at least 50 percent breakdown of the original biological material.

Any one of the members of the group "dehydrated and partially decontaminated manure" have been treated without adding carbon using a dehydration process, such as by drying in a dryer for an appropriate period of time based on the thickness of the animal manure and/or animal parts, including feathers and eggs, to be dried, such as 24 hours for a 2 inch thick portion of the manure, wherein the dehydrated and partially decontaminated manure has at least 30 percent less water and at least some of the *salmonella* and some of other bacteria in the animal manure and/or animal parts, including feathers and eggs removed, if using a temperature adequate for killing most or all of these organisms.

The phrase "vulcanized rice hulls" as used herein can refer to vulcanized rice hull ash such as those from UNCLE BEN'S® of Houston and Louisiana, wherein the rice hulls have been crushed, heated to charring, and blended with vegetable oil to prevent explosions. Examples of vulcanization of rice hulls can be found in prior art and are well known to those skilled in the industry. The vulcanized rice hulls of the present invention, however, do not require the addition of alkaline, borates, or other additives besides the organic, non-toxic, and cheap vegetable oil. In this definition, the vulcanized rice hulls can be whole, powdered, very small particulate, or combinations thereof.

The phrase "conventional fertilizer" as used herein can refer to one or more of a variety of conventional fertilizers, which can be "nitrogen-potassium-phosphorous" fertilizers or a "nitrogen-potassium-phosphate" fertilizer further containing humates and or other fertilizers.

The term "plant" as used herein can refer to a tree, a shrub, a group of shrubs, a plant, a group of plants together, or combinations thereof.

The term "turf" as used herein can refer to grass as well as native or invasive vegetative ground cover.

The term "sand" as used herein can refer to a loose granular substance, resulting from the erosion of siliceous and other rocks and forming a major constituent of beaches, riverbeds, seabeds, and deserts.

The term "loam" as used herein can reference to a soil composed of a mixture of sand, clay, silt, and organic matter.

The term "clay" as used herein can refer to a fine-grained material that consists of hydrated aluminum silicate, quartz, and organic fragments and occurs as sedimentary rocks, soils, and other deposits.

The term "topsoil" as used herein can refer to a layer of soil that is rich in organic matter and nutrients.

The term "compost" as used herein can refer to decayed organic material used as a plant fertilizer. Examples of compost can be mulch, manure, bone meal, fish meal, blood meal, guano, humus, peat, seaweed, plant food, top dressing, or similar materials.

The definition of "prepared topsoil" as used herein is ⅓ part sand, ⅓ part topsoil, and ⅓ part compost.

The definition of "nutrient" as used herein can include any mineral or substance that is absorbed by an organism, nourishes an organism, or provides or contributes to nourishment of an organism.

The term "manure" as used herein can include organic matter used as organic fertilizer in agriculture and contributes to the fertility of the soil by adding organic matter and nutrients, such as nitrogen, phosphate, or potassium.

The term "ant deterrent" as used herein can be any substance that repels insects, such as ants.

As used herein "NPK" refers to the ratio of important elements in a fertilizer or soil amendment. N stands for nitrogen, which is responsible for strong stem and foliage growth. P is for phosphorus, which aids in healthy root growth and flower and seed production. K stands for potassium, which is responsible for improving overall health and disease resistance.

As used herein, ASTM refers to the American Society for Testing and Materials, and the standards established for mesh/sieve sizes.

Embodiments can further be used as an ant deterrent, since fertilizer can comprise an organic pesticide, an inorganic pesticide, or combinations thereof for control of ant population.

The embodiments further relate to using an amorphous silica with the manure. It is contemplated that a crystalline silica can be utilized, or added in some embodiments.

In embodiments, the amorphous silica can be solely derived from vulcanized rice hulls and vulcanized rice hull ash.

The present invention relates to the discovery that the vulcanized rice hull ash absorbs nutrients contained in manure during processing of vulcanized rice hull ash, and in the presence of heat and water the blend creates a covalently bonded matrix that allows a slow release of nutrients into the soil over time. Alternatively, binding agents can be used to create a bonded matrix.

The present invention relates to the discovery that the agglomerated particles of dehydrated manure with vulcanized rice hull ash can hold more water, at least 10 percent more water than material which did not include an agglomerated particle or "granule" structure wherein the granules are ionically attracted together.

Another aspect of the present invention relates to the discovery that the prepared soil remediation product is initially a dehydrated product that, once applied to the soil, can absorb moisture and hold that moisture adjacent roots of turf and or plant materials, thereby acting as a storage device for water which slowly releases over time.

The present invention has the advantage of being able to decompose into a non-toxic dirt over time.

Another aspect of the present invention relates to the discovery that the charred material of the vulcanized rice hulls provides more effective nitrogen transmission into the soil than commercially available soil remediation products, including water retaining gels. Embodiments may make use of a range of 0.25 weight percent to 99.75 weight percent of soil remediation product.

Another aspect of the present invention relates to the discovery that the dried agglomerated particles incorporated into the commercial fertilizer have a dual functionality, that of providing a slow release of water over time and a slow release of nutrients over time. Further, the dried agglomerated particles incorporated into the commercial fertilizer have a shelf life longer than other types of fertilizer.

Turning now to the Figures, FIG. 1 shows the steps of the method for producing the soil remediation product according to one or more embodiments.

An embodiment of the method can include forming agglomerated granules made of dehydrated decontaminated manure slurry, vulcanized rice hulls, and water, as illustrated in step 100.

The method can include drying the agglomerated granules using a temperature up to 1000 degrees Fahrenheit, raising the temperature of the agglomerated granules over a preset period of time to reduce water content in the agglomerated particles by at least 20 weight percent, and forming dried agglomerated particles with 0.25 weight percent to 99.75 weight percent vulcanized rice hulls, as illustrated in step 102. The time to raise the temperature of the agglomerated granules can be less than 1 hour.

The method can include cooling the dried agglomerated particles, as illustrated in step 104.

The method can include blending from 30 weight percent to 50 weight percent of the cooled dried agglomerated particles with a 50 weight percent to 70 weight percent of a conventional fertilizer, forming a usable soil remediation product that holds at least 10 weight percent more water than conventional fertilizer without the dried agglomerated particles. The blend provides a timed release of nutrients to the plants in the soil into which the soil remediation product has been applied in part due to the presence of nanoparticles in the product, as illustrated in step 106.

Embodiments of the invention include a soil remediation product produced by the method described above.

FIG. 2 shows the steps of the method for using the soil remediation product of FIG. 1 according to one or more embodiments.

An embodiment of the method can include aerating the turf with a turf aerator, a shovel, or other device until the turf has a plurality of plug holes wherein each plug hole is at least 1 inch deep, or other aeration geometry, as illustrated as step 200.

The method can include applying the soil remediation product at a rate of at least 5 pounds per 1000 square foot, at least partially filling the plug holes or around plug holes, as illustrated in step 202.

The method can include fully saturating the turf within 48 hours using water, as illustrated in step 204.

FIG. 3 shows the steps for an alternate embodiment for making the soil remediation product.

The method can include forming a composition comprising: 0.01 weight percent to 99.99 weight percent vulcanized rice hulls, 0.01 weight percent to 99.99 weight percent of a fertilizer comprising an NPK content, and up to 99.99 percent water as illustrated in step 300.

The method can include drying the composition at a temperature up to 1000 degrees Fahrenheit and raising the temperature over a preset period of time, such as less than 1 hour, to reduce water content in the composition by at least 20 weight percent and forming a dried composition comprising 0.25 weight percent to 99.75 weight percent rice hulls as illustrated in step 302.

The method can include cooling the dried composition to yield a usable product as illustrated in step 304.

FIG. 4 shows an example of a top view of a root structure 400. Plug holes 402 have been made in the soil surrounding the root structure 400. Soil remediation product 404 has been spread in the area of the plug holes 402. Some soil remediation product 404 can be spread on the ground surrounding the plug holes 402, and some soil remediation product 404 can be inside the plug holes 402. The plug holes 402 can be of any shape or diameter necessary to properly provide soil remediation. For example, instead of plug holes 402 to aerate the soil, a small trench could be dug, which is not shown.

Figure 5:
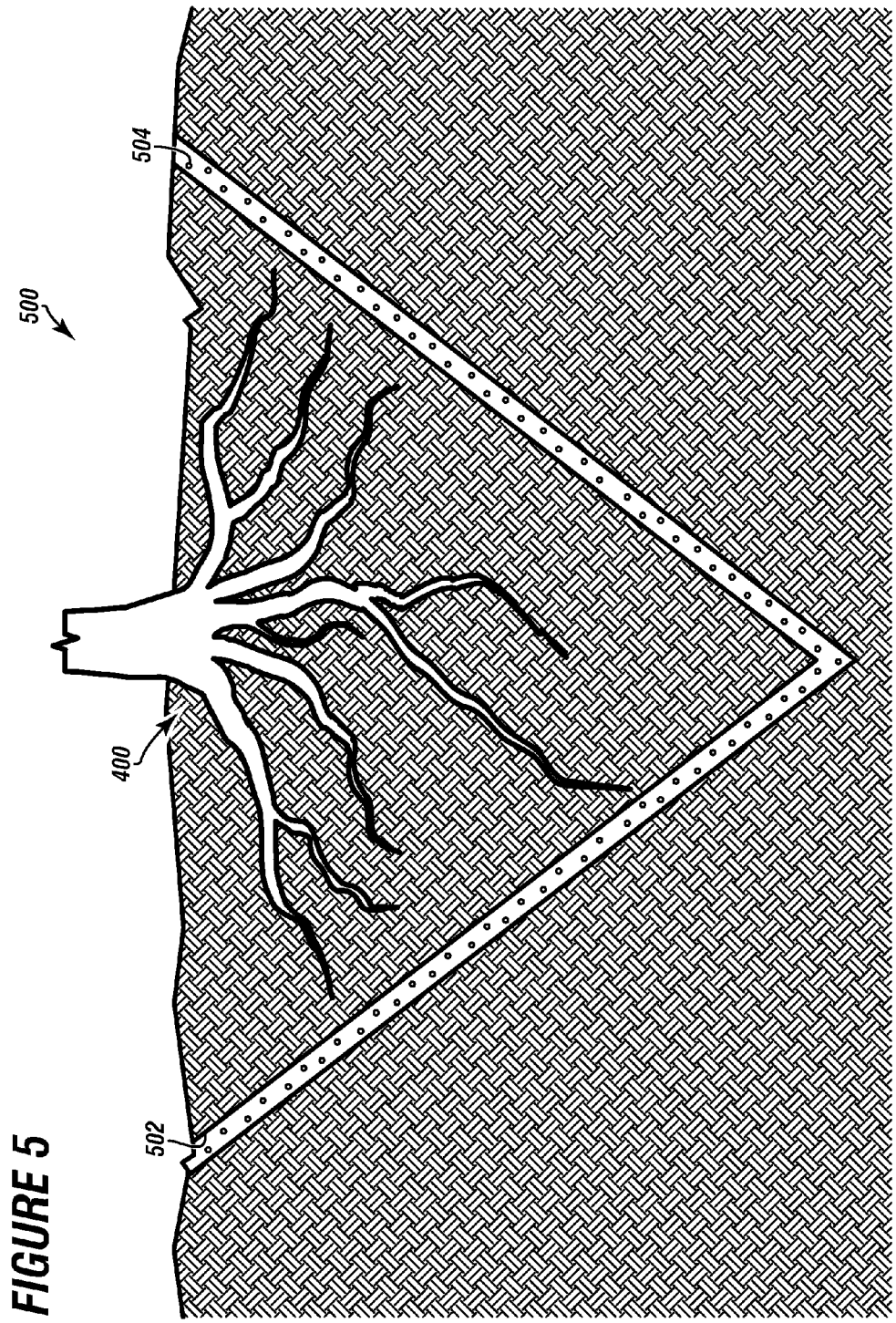
FIG. 5 shows a root structure being inserted into a planting site according to one or more embodiments.

FIG. 5 shows a root structure 400 being inserted into a planting site 500. The walls 502 of the planting site may be treated with the agglomerated granules 504 of the composition.

Applications of liquid, pelletized or granulated fertilizer can be horizontally columnar, vertically columnar, columnar at any degree angle, or combinations thereof into the soil. Plug holes or other aeration methods can range in size, shape, and depth depending on the application.

An embodiment of the method of fertilizer installation for turf and plants varies based on type of application. Applications of liquid, pelletized or granulated fertilizer can be mechanically installed with a water injection system, a turf aerator, a shovel, a landscape broadcast spreader, a hydroseeder, tilled into soil areas, or a similar method.

For example, a 600 pound sample soil remediation product can be composed of 300 pounds of agglomerated granules blended with 300 pounds of conventional fertilizer.

The agglomerated granules can be formed by using dehydrated decontaminated manure made from 80 weight percent water and 20 weight percent manure solids without additional carbon which has been dried, such as in a drier to a water reduction level of about 20 percent. The manure is then blended with vulcanized rice hulls, which provide silica for binding with the manure in a matrix forming the agglomerated granules.

300 pounds of agglomerate granules of this Example have 20 weight percent dehydrated decontaminated manure slurry with 75 weight percent vulcanized rice hulls and 5 weight percent water.

By blending the agglomerated granules with a conventional fertilizer in a 50/50 mix, 600 pounds of usable soil remediation product are formed which can hold at least 10 weight percent more water than conventional fertilizer without the dried agglomerated particles and provide a timed release of nutrients to the plants in the soil into which the soil remediation product has been applied in part due to the presence of nanoparticles in the product.

For example, a single application of 600 pounds of product can be spread over 1 acre for a 10 percent reduction in water usage for a crop or turf. Future applications can further reduce water consumption to over 25 percent.

In an embodiment, large size agglomerated particles can be used for cleanup of petrochemical products as well as crude oil for absorption, and can then be squeezed, dried, reused, or combinations thereof.

In an embodiment, agglomerated particles can be used for cleanup of petrochemical products as well as crude oil for absorption, and can then be, extracted, dried, reused or combination thereof, and potentially used as a fuel cell source through release and reabsorption of fuel material.

In embodiments, from 15 weight percent to 50 weight percent of dehydrated decontaminated manure can be used, wherein the manure is made from a slurry of 60 weight percent to 80 weight percent water, and 20 weight percent to 40 weight percent manure solids, without additional carbon.

The dehydrated manure involves using the manure described above and drying the manure in a drier at an elevated temperature, to not only remove 80 percent of the water but to also reduce *salmonella* content and reduce bacteria content.

From 0.25 weight percent to 99.75 weight percent of dehydrated decontaminated manure is combined with 0.25 weight percent to 99.75 weight percent of vulcanized rice hulls. From 1 weight percent to 99.5 weight percent water is added to the above ingredients and blended to form the agglomerated granules. The formed agglomerated granules have a diameter to be stopped by ASTM mesh sizes from 1 to 400. The diameter of the formed agglomerated granules can vary based upon application and desired results.

The ratio of the dehydrated and decontaminated manure slurry percentage to the vulcanized rice hulls percentage ranges from 1:99 to 75:25 and the dehydrated and decontaminated manure appears to be covalently attracted to the vulcanized rice hulls and the agglomerated particles form a matrix of the dehydrated and decontaminated manure within the vulcanized rice hulls.

The agglomerated granules are dried, such as by using a temperature ranging up to 1000 degrees Fahrenheit in a drier. The granules are treated such that the temperature of the granules rises to a temperature of about 180 degrees Fahrenheit to 200 degrees Fahrenheit over a preset period of time, to reduce water content in the agglomerated particles by at least 20 weight percent, thereby forming dried agglomerated particles with 0.25 weight percent to 99.75 weight percent vulcanized rice hulls content.

In embodiments, a cooler can be used to reduce the temperature of the dried agglomerated particles, or the particles can be cooled at a slower rate, so long as water absorption is not encouraged.

From 50 weight percent to 30 weight percent of the cooled dried agglomerated particles are blended with a 50 weight percent to 70 weight percent of a conventional fertilizer based on the total of the overall formulation, creating a usable soil remediation product which is non-toxic, and can hold at least 10 weight percent more water than conventional fertilizer without the dried agglomerated particles and additionally provides a timed release of nutrients to the plants in the soil into which the soil remediation product has been applied in part due to the presence of nanoparticles in the product.

In one or more embodiments, the method can include using agglomerated particles that are stopped by a sieve with ASTM mesh sizes from 1 to 400.

In one or more embodiments, the method can include adding from up to 0.75 weight percent of acetic acid to the agglomerated particles. In embodiments, the acetic acid can act as a growth promoter.

In one or more embodiments, the method can include adding from up to 0.75 weight percent of an antifungal to the agglomerated particles, such as using ANTIBAC® available from Diversey, Inc.

In one or more embodiments, the method can include adding sand, rice hull ash, top soil, organic compost, mulch, crystals, nanospheres, nanoparticles, or nanobots to the agglomerated particles.

In one or more embodiments, the method can include adding from 10 weight percent to 15 weight percent of an oatmeal to a conventional fertilizer to form the soil remediation product, wherein the oatmeal additionally and unexpectedly encapsulates and absorbs water.

In one or more embodiments, the method can include adding from 1 weight percent to 99 weight percent of glass nanospheres to the conventional fertilizer.

In one or more embodiments, the method can include adding from 1 weight percent to 3 weight percent of inert filler nanoparticles to the conventional fertilizer to form the soil remediation product. The inert filler can include filler which contains magnesium, sulfur, boron or other trace minerals listed on the periodic table.

In one or more embodiments, the method can include using the soil remediation product that involves aerating the soil around a plant or flower beds using a shovel, mechanical tiller, or combinations thereof. Next, the method can include applying a layer of 5 pounds of soil remediation product per 1000 square feet of aerated soil. Finally, the applied soil remediation product is fully saturated with water.

The methods to install fertilizer can vary based on application, application rates and soil types. Some examples of soil types can include sand, loam, clay and rock.

In another embodiments, the method for making a water management product for turf and plants, wherein the method forms a composition comprising: 0.01 weight percent to 100 weight percent vulcanized rice hull ash; 0.01 weight percent to 100 weight percent of a fertilizer comprising an NPK content; and up to 99.99 weight percent water.

The composition is then dried using a temperature ranging up to 1000 degrees Fahrenheit and raising a temperature of the composition over a preset period of time to reduce water content in the composition by at least 10 weight percent and forming a dried composition with 5 weight percent to 100 weight percent vulcanized rice hulls; and then the dried composition is then cooled yielding the product.

Any material comprising an NPK value can be used as a fertilizer. In other embodiments, the vulcanized rice hull ash can be used as a substitute for the fertilizer.

While these embodiments have been described with emphasis on the embodiments, it should be understood that within the scope of the appended claims, the embodiments might be practiced other than as specifically described herein.

What is claimed is:

1. A method of making a soil remediation product, wherein the soil remediation product comprises a dehydrated and partially decontaminated manure blended with vulcanized rice hulls, and wherein the method comprises:
  a. forming agglomerated granules comprising:
     (i) 5 weight percent to 95 weight percent dehydrated decontaminated manure slurry comprising:
        1. 10 weight percent to 90 weight percent water; and
        2. 10 weight percent to 90 weight percent manure solids, without additional carbon with reduced *salmonella* content and with reduced bacteria content;
     (ii) 5 weight percent to 95 weight percent vulcanized rice hulls;
     (iii) 1.0 weight percent to 90 weight percent water; and
     (iv) wherein the ratio of the dehydrated and decontaminated manure slurry weight to the vulcanized rice hulls weight is from 1:99 to 75:25, and the dehydrated and decontaminated manure and the vulcanized rice hulls form a matrix;
  b. drying the agglomerated granules using a temperature up to 1000 degrees Fahrenheit, raising a temperature of the agglomerated particles over a preset period of time to reduce water content in the agglomerated particles by at least 20 weight percent, and forming dried agglomerated particles with 0.25 weight percent to 99.75 weight percent vulcanized rice hulls;
  c. cooling the dried agglomerated particles; and
  d. after cooling, blending from 5 weight percent to 95 weight percent of the dried agglomerated particles with a 5 weight percent to 95 weight percent of at least one of: sand, rice hull ash, top soil, organic compost, mulch, crystals, nanospheres, nanoparticles, or nanobots and further blending with a conventional fertilizer to form a usable soil remediation product that holds at least 10 weight percent more water than conventional fertilizer alone, and provides a timed release of nutrients to the plants in the soil into which the soil remediation product has been applied.

2. The method of claim 1, further comprising using agglomerated particles that are stopped by a sieve with a mesh having ASTM mesh sizes from 1 to 400.

3. The method of claim 1, further comprising adding up to 0.75 weight percent of acetic acid to the agglomerated particles.

4. The method of claim 1, further comprising adding up to 0.75 weight percent of an antifungal to the agglomerated particles.

5. The method of claim 1, further comprising adding from 5 weight percent to 50 weight percent of an oatmeal to the conventional fertilizer to form the soil remediation product.

6. The method of claim 1, further comprising adding from 1 weight percent to 90 weight percent of glass nanospheres to the conventional fertilizer.

7. The method of claim 1, further comprising adding from 1 weight percent to 99 weight percent of inert filler nanoparticles to the conventional fertilizer to form the soil remediation product.

8. The method of claim 1, further comprising the steps of:
  a. optionally aerating a soil around a plant or a flower bed;
  b. applying a layer of at least 5 lbs per 1000 square feet of the soil remediation product on the soil; and
  c. fully saturating the applied soil remediation product with water.

9. The method of claim 1, further comprising the steps of:
  a. aerating a turf until the turf has a plurality of plug holes, wherein each plug hole is at least 1 inch deep;
  b. applying the soil remediation product around or in the plug holes; and
  c. fully saturating the turf with water.

10. A soil remediation product made by the method of claim 1.

* * * * *